(12) United States Patent
Helm

(10) Patent No.: US 9,119,402 B2
(45) Date of Patent: Sep. 1, 2015

(54) COOKING APPARATUS HAVING A VAPOR CONDENSATION DEVICE

(75) Inventor: Peter Helm, Wolfenbuttel (DE)

(73) Assignee: MKN Maschinenfabrik Kurt Neubauer GmbH & Co. KG, Wolfenbuettel (DE)

(*) Notice: Subject to any disclaimer, the term of this patent is extended or adjusted under 35 U.S.C. 154(b) by 856 days.

(21) Appl. No.: 12/920,650

(22) PCT Filed: Mar. 5, 2009

(86) PCT No.: PCT/EP2009/052600
§ 371 (c)(1),
(2), (4) Date: Nov. 24, 2010

(87) PCT Pub. No.: WO2009/109621
PCT Pub. Date: Sep. 11, 2009

(65) Prior Publication Data
US 2011/0072983 A1    Mar. 31, 2011

(30) Foreign Application Priority Data
Mar. 6, 2008    (DE) .................. 10 2008 012 961

(51) Int. Cl.
A47J 27/04    (2006.01)
A23B 4/03    (2006.01)
A23B 4/044    (2006.01)
B60H 3/00    (2006.01)
A21B 3/04    (2006.01)

(52) U.S. Cl.
CPC ........................................ *A21B 3/04* (2013.01)

(58) Field of Classification Search
CPC .......................................................... A21B 3/04
USPC ..................... 99/473–476, 468, 470; 219/401
See application file for complete search history.

(56) References Cited

U.S. PATENT DOCUMENTS

2004/0261632 A1    12/2004 Hansen et al.
2006/0260476 A1*    11/2006 Helm .............................. 99/476

FOREIGN PATENT DOCUMENTS

DE    1 679 119    10/1970
DE    30 27 566    4/1982
(Continued)

OTHER PUBLICATIONS

Derwent abstract of EP-92851-A, Heat Treatment Plant for Food Stuff, Nov. 2, 1983.*

*Primary Examiner* — Dana Ross
*Assistant Examiner* — Lindsey C Teaters
(74) *Attorney, Agent, or Firm* — Jansson Munger McKinley and Shape Ltd.

(57) ABSTRACT

A cooking apparatus has a cooking chamber (10). The vapors created in the cooking chamber (10) are removed with a vapor outlet channel (31). A vapor condensation device (40) brings the vapors into contact with cooling liquid. The vapor condensation device (40) has a container (41), in which a liquid bath (42) is located. The vapor outlet channel (31) carries the vapors out of the cooking chamber (10) into the container (41) of the vapor condensation device (40). There, the vapors are brought into contact with the liquid from the liquid bath (42) and thereby partially condensed. Furthermore, a device drain (36) is provided. The container (41) of the vapor condensation device (40) has a vapor guide element (43). Said element guides the vapors through one or more channels in the container (41). The vapor guide element (43) is configured such that one wall of the wall surfaces of the channel or channels is formed by the surface of the liquid bath (42) in the container (41).

9 Claims, 2 Drawing Sheets

(56) References Cited

FOREIGN PATENT DOCUMENTS

| DE | 32 15 812 | 11/1983 |
| DE | 43 33 585 | 4/1995 |
| DE | 101 62 953 | 10/2003 |
| DE | 10 2005 050 483 | 4/2007 |
| DE | 10 2006 034 081 | 1/2008 |
| EP | 0 092 851 | 11/1983 |
| FR | 2 614 089 | 10/1988 |

* cited by examiner

COOKING APPARATUS HAVING A VAPOR CONDENSATION DEVICE

TECHNICAL FIELD

The invention relates to a cooking apparatus having a cooking chamber, having a vapor outlet channel for vapors created in the cooking chamber, having a vapor condensation device that brings the vapors into contact with cooling liquid, with the vapor condensation device comprising a container in which a liquid bath is located and with the vapor outlet channel carrying the vapors out of the cooking chamber into the container of the vapor condensation device, where the vapors are brought into contact with the liquid from the liquid bath and thereby partially condensed, and having a device drain.

BACKGROUND OF THE INVENTION

Cooking apparatuses for cooking or baking products are, for example, hot-air apparatuses, hot-air steamers, or baking ovens. They comprise a cooking chamber in which a food is prepared.

During the cooking process, so-called vapors are formed in the cooking chamber of the cooking apparatus. Vapors are predominantly in the form of steam and also consist of water vapor for the most part. In addition, they also contain oils and fats, which are present in the form of aerosols or else in liquid form. Other components may also be contained therein. The vapors are created during the cooking process through the vaporization of water that is contained in the foods; in addition, however, vapor that is fed into the cooking chamber of the apparatus also contributes to the creation of vapors. This feeding can be brought about either by way of an external steam generator or else also by direct vaporization of water inside of the hot cooking chamber. This water vapor is absolutely intentional and is important for certain aspects of the cooking process.

When fat-containing foods or fat-containing cooking products are cooked at high temperatures, the aforementioned oil and fat aerosols are additionally created.

In the case of so-called pressureless cooking apparatuses, a possibility must be created to allow excess vapors to escape. Otherwise, a pressure would build up within the cooking chamber. In order to prevent this, conventional cooking apparatuses often have an exhaust air opening from which the steam or the vapors can escape into the room air. In the case of high-performance apparatuses, this can lead to a strong accumulation of moisture and heat in the room air in the surroundings of the cooking apparatus and in the entire kitchen premises. Moreover, the room is also dirtied by the oil and fat aerosols. Hence, adequate ventilation and exhaust measures are required in rooms in which such cooking apparatuses having a relatively high capacity are installed. The rate of air exchange necessarily associated with these ventilation and exhaust measures results in a high energy requirement for the exhaust as well as additionally for the cooling and heating of the room air. For reasons of building engineering, in certain cases it is not even possible to install an exhaust unit, such as, for example, in the case of old buildings and/or for reasons of preservation of historic buildings or else in the case of so-called mobile catering.

In older grilling apparatuses, such as those known from DE 16 79 119 B, it is sufficient just to carry out a regular ventilation of the interior of the grill oven with fresh air and then to conduct away the smoke that is created. For this, it has already been suggested to pass the smoke through scrubbing or absorption equipment, which can be arranged in the lower part of the oven and can consist of a plurality of sheet metal partitions. In this way, the smoke will be forced through substances in order to deposit contaminants.

In order to reduce the problems entailed with ventilation and exhaust measures, an attempt is made to keep the created quantities of vapors as small as possible or else to reduce their discharge into the room air. Known for this purpose is the placement of water nozzles in the region of the exhaust opening or in the vapor channels by way of which the vapors are discharged into the room air. A baking oven having roughly this form of construction is described in DE 30 27 566 C2. These water nozzles can create a water mist, which results in the condensation of a portion of the vapors. This condensate is then carried to the drain of the cooking apparatus.

On account of the tight space situation within cooking apparatuses, such a condensation cannot be designed very effectively. This means that the water consumption is quite high in relation to the condensation capacity. Moreover, the relatively small cross sections of the nozzles that are used for creating the water mist become clogged relatively quickly with calcium deposits and dirt particles.

Proposed in DE 32 15 812 C2 is the condensation of the vapors in a mixing condenser, which is located within the cooking chamber and is designed to act at the same time as a water barrier like a type of siphon.

Described in DE 101 62 953 A1 is the creation of an additional condensation chamber beneath the cooking chamber, into which the vapors are introduced via a feed line. There, they are cooled with a water jet from an injector nozzle so that condensation can take place. After the condensation, the liquid vapors then run into the drain.

Known from DE 10 2006 034 081 A1 is another possibility of directing the vapors into a condensation device beneath the cooking chamber for condensing vapors and/or steam out of the cooking chamber, this device operating with a quenching device that injects water into the condensation device.

In order to bring about a more effective condensation of the vapors, therefore, external condensation devices are usually used. These are separate devices that are connected directly to the cooking apparatus. The vapors are carried to these condensation devices and the heats of vaporization of the vapors are then removed in these condensation devices by means of water injection or air cooling and accordingly condensed to the greatest extent possible. The greater volumes of these external condensation devices makes possible a markedly better condensation of the vapors. Undesired odor-causing substances and the fat and oil aerosols can be removed or eliminated by the water injection and also by additional filters.

Such a possibility is known, for instance, from DE 10 2005 050 483 A1, in which, after the heat treatment of the food, the vapors are carried into a separate device having a liquid bath in a container, with the carried gaseous vapors being passed through the liquid bath, which, moreover, is cooled.

A drawback of these concepts is that, in each case, an additional device is required, leading, on the one hand, to higher costs and, on the other hand, also to an appreciable increase in the volume of the overall apparatus made up of the cooking apparatus and the condensation device.

Therefore, the treatment of vapors in cooking apparatuses continues to remain a problem, because either their appropriate reduction is ineffective or else very costly and necessitates space-consuming designs.

The problem of the invention, therefore, is to propose a cooking apparatus that makes do without additional voluminous devices and, nonetheless, offers an effective reduction in the vapors discharged into the room.

SUMMARY OF THE INVENTION

This problem is solved for a cooking apparatus of the class-specific type in that the container of the vapor condensation device comprises a vapor guide element, which guides the vapors through one or more channels in the container and in that the vapor guide element is constructed such that one of the wall surfaces of the channel or channels is formed by the surface of the liquid bath in the container.

Such a conception makes it possible to integrate the vapor condensation within the cooking apparatus and, nonetheless, to achieve a reliable, low-cost, and very effective reduction in the vapors.

This is accomplished by attaching a container, particularly a bin-shaped container, to the vapor outlet channel from the cooking chamber; a liquid bath having a water level on which the vapors can condense is located in this container.

In accordance with the invention, a vapor guide element is thus integrated into the bin-shaped container of the vapor condensation device. This vapor guide element is constructed in such a way that the vapors that enter the container are carried there through various channels or else through one specially formed channel. One wall surface of the channel or channels thus formed is the water surface of the liquid bath itself.

The vapor guide element is constructed in such a way that the contact time of the flowing vapors with the surface of the liquid bath is as long as possible. As a result, the possibility that a vapor molecule of the vapors is situated in the immediate vicinity of a cold surface, in particular the surface of the liquid bath, is increased.

This occurs preferably by constructing the channels formed by the vapor guide elements and the surface of the liquid bath or the corresponding channel in a meandering shape or in a spiral shape. In this way, it is possible to achieve a particularly effective prolongation of the contact time of the vapors flowing through the channels.

Other geometries are also conceivable; however, it has been found that, in the case of a meandering or spiral design of the channel or channels, the vapor guide elements can also be produced at low cost and the contact surface provided by the surface of the liquid bath can be utilized particularly effectively.

It needs to be taken into consideration here that the vapor guide element has a relatively simple geometric design when the lower boundary of the channels thereby formed is created by the liquid surface of the liquid bath. In this case, then, the other walls of the channels formed by the vapor guide element need only dip into the liquid bath in order to prevent flow short circuits.

The steam of the vapors condenses on the liquid surface particularly quickly, because it is relatively simple to keep the temperature of the liquid surface below the condensation point of the vapors, this condensation point corresponding roughly to that of water vapor.

This can be achieved preferably by providing a temperature-controlled valve, which, as needed, feeds fresh water to the liquid bath in the container. As a result, the temperature of the liquid bath and, in particular, the temperature in the region of its surface can be kept constantly below the boiling point of 100° C., ideally even below 80° C.

The cooling water can also be supplied without a nozzle and with a large outlet cross section so as to avoid the risk of clogging.

A corresponding temperature regulation can be integrated into the apparatus control of the cooking apparatus that is also responsible for regulating the temperature in the interior of the cooking chamber.

It is particularly preferred when the vapor outlet channel is, at the same time, a drain for liquids from the cooking chamber and the container in the vapor condensation device is, at the same time, a collecting basin for the liquid draining out of the cooking chamber and, in this case, running into the liquid bath in the container.

This solution is thereby especially ideal, because cooking apparatuses are also furnished conventionally with a bin into which runs, for example, the cleaning liquid that collects when, in a cleaning process after the cooking process, the interior of the cooking chamber is cleaned and the corresponding liquids have to be conducted away. Liquid fats from the interior of the cooking chamber are also conducted away in this way. This very bin can now be utilized simultaneously as a container of the vapor condensation device in accordance with the invention.

It is thus preferably provided to utilize a drain, which, in the case of such concepts, is employed also conventionally as an apparatus drain for the cleaning liquid and the additional contaminants that are conducted away with it, also for conducting away the collecting condensate.

This is also of advantage for the reason that a temperature-controlled valve for the feeding of cooling water can also be used to keep the wastewater temperature within the prescribed limits. In any case, only wastewater at certain maximum temperatures may be fed into the public sewer system; it is possible also to maintain these temperatures in this way and to comply therewith.

It is preferred here if an exhaust air channel is provided in the container of the vapor condensation device. The condensation of the vapors in the channels of the vapor guide element also results in the formation of air released by the condensed water and the aerosols, which can be discharged into the room air through this exhaust air channel. In contrast to conventional exhaust air, this exhaust air now contains appreciably less moisture and also contains markedly less fat and oil aerosols or other contaminants, because these are retained to the greatest degree possible in the liquid bath due to the condensation. The exhaust air exiting this exhaust channel from the water condensation device is also appreciably less offensive than the exhaust air that comes conventionally directly out of the cooking chamber.

The mentioned apparatus drain from the bin-shaped container of the vapor condensation device conducts, as mentioned, all of the liquids arising from the operation of the cooking apparatus into the building sewer system and disposes of these liquids.

The height of the apparatus drain in the container determines, at the same time, also the level of the water of the liquid bath. As a result, it is possible to keep the height of this water level constant in a simple manner.

In order to prevent gases from the apparatus drain from being able to pass into the sewer system or, inversely, in order to prevent gases from the sewer system from being able to pass into the vapor condensation device and thereby enter the cooking chamber or the surroundings, it is preferred when a siphon is arranged upstream the apparatus drain in the container, and the liquid bath in the container constitutes, at the same time, a water reservoir in the siphon.

It is also of advantage that the steam of the vapors condenses particularly quickly on the water surface. The condensation does not change the property of this surface, because it, too, consists essentially of water, as does the condensing steam from the vapors. A condensation of solids leads conventionally, as a rule, to an impairment of further condensation, which, however, does not occur at all according to the invention.

The vapor guide element preferably has an opening above the liquid level of the liquid bath in order that the gaseous and uncondensed gases can escape from the vapor guide element and the channels.

It is particularly preferred for this purpose if the vapor guide element has a segment at its downstream outlet in which it does not extend through the surface of the liquid bath into the liquid bath, but rather forms a passage lying above the surface.

This means that the oil and the other foreign components that have been deposited on the surface of the liquid bath inside of the vapor guide element can leave the vapor guide element once again at this point by floating onto the surface here and being expelled. As a result, the collection of these deposited components, such as, for example, oil, is prevented within the vapor guide element. Instead of this, they can now leave the apparatus in their entirety via the apparatus drain.

As a further guide, the container has the aforementioned exhaust air channel, which opens into the room air. This exhaust air channel also allows other, noncondensable gases to be discharged into the room air. These gases are, in particular, the air that has to be supplied for heating and cooling operations, for example, in order to maintain the pressure in the cooking chamber at ambient pressure. It is indeed essentially crucial that, insofar as possible, all of the vapors are condensed within the vapor guide element before the vapors reach the exhaust air outlet.

The condensation of the steam from the vapors leads to an increase in the water level, which, however, leads simultaneously to an increase in the drainage. Indeed, the water level thus remains constant during the condensation operation.

Preferably, it is further provided that the cooling water, which is fed through the temperature-controlled valve, in particular a solenoid valve, is delivered to a horizontal wall of the water-carrying element, so that the wall itself is thereby cooled.

This improves the condensation effect of the entire vapor condensation device.

This can be enhanced still further by providing a raised edge on the horizontal surface against which the water impinges, so that a water level remains on this surface. This results in a longer contact time between this cooling water and the vapor guide element. As a result, the temperature of the vapor guide element can be kept lower in turn. When the surface is filled, the water runs automatically into the container and from there into the drain.

It is preferred, moreover, if the cooling water inlet feeds the cooling water adjacent to the vapor exhaust channel.

This has the advantage that the additional liquid promotes a flow that, within the vapor guide element, transports the components condensing on the surface of the liquid bath, such as, for example, oils, in the same direction as also the flowing vapors themselves. As a result, the oils that settle on this surface also move in the direction toward the outlet of the vapor guide element and do not remain stuck within the channels.

Preferably, the vapor guide element is made of a material having a high thermal conductivity and a high heat capacity. As a result, it is also possible to increase the condensation capacity in the resulting channels or channel.

A further optimization of the vapor guide element can be achieved by having the channel decrease in cross section continuously or at least all at once at one time in the flow direction of the vapors in the channel. In this way, it is possible to take into consideration that, during its flow through the channel or channels of the vapor guide element, the vapors steadily decrease in volume due to the condensation of the vapors. If, then, the cross section of the channels is also decreased, the contact probability of the vapors with the walls increases in turn, with, as mentioned, one of the walls forming the surface of the liquid bath.

As a result of the decrease in the cross section of the channel or channels, it is also possible to design the vapor guide element to be even more compact.

On account of the heat storage capacity and the always present liquid surface as one of the walls, a continuous cooling of the vapor condensation device with water is not required, so that only the amount of water required for condensation need be supplied. As a result, a particularly conserving intermittent operation can take place via the temperature-controlled valve. This is particularly true when the temperature of the liquid in the liquid bath is determined by a temperature sensor and is used as control parameter for the valve, in particular, a solenoid valve.

The oil and fat aerosols that condense or bond to the water can be readily conducted away by means of the apparatus drain and thus do not lead to deposits in or clogging of the channel or channels in the vapor guide element. Moreover, the solids can also involve, for instance, small fibers or fragments coming from the food being cooked in the cooking chamber, which have detached from the food being cooked and have entered the vapor condensation device and the container together with the vapors through the vapor outlet channel. These fragments of the food being cooked or other solids thus enter the liquid bath as well.

Because the vapor guide element according to the invention is open at the bottom for solids and liquids or the lower wall is formed by the surface of the liquid bath, the likelihood of clogging of the channel or channels is extremely small. Solids can also sink to the bottom of the liquid bath.

A further improvement is then afforded when the vapor guide element only dips slightly into the liquid and, below the vapor guide element, there is a sufficiently deep liquid depth in the liquid bath. As a result, the risk of clogging due to undissolved components in the liquid bath is very small, because these undissolved components below the vapor guide element can move about freely and thus can reach the apparatus drain particularly easily.

The liquid level below the vapor guide element should be sufficiently great in this case that the solid elements entering the container in the vapor condensation device—for example, residues of cooked foods—can move about freely beneath the vapor guide element. A further advantage ensues from the fact that it is particularly simple to clean the container having the vapor guide element by means of automatic cleaning or else also by means of manual cleaning.

In the preferred embodiment of the invention, also those solids or cooked food fragments that float on the surface of the liquid bath together with the oil components that were deposited are conducted to the outlet of the vapor guide element through the channels thereof along with the liquid flowing near to the surface based on the cooling water inlet and can leave the vapor guide element through the opening preferably provided there.

It is found surprisingly that, by way of a vapor guide element that is relatively simple in design, a prolongation of the contact time can be achieved as well as an increase in the contact likelihood between the vapors and the cold wall or the surface of the liquid bath and hence the condensation of the vapors can be ensured without a particularly complicated additional device.

DESCRIPTION OF THE DRAWINGS

An exemplary embodiment of the invention will be discussed in detail below on the basis of the drawing. Shown are.

DETAILED DESCRIPTION

Figure 1:
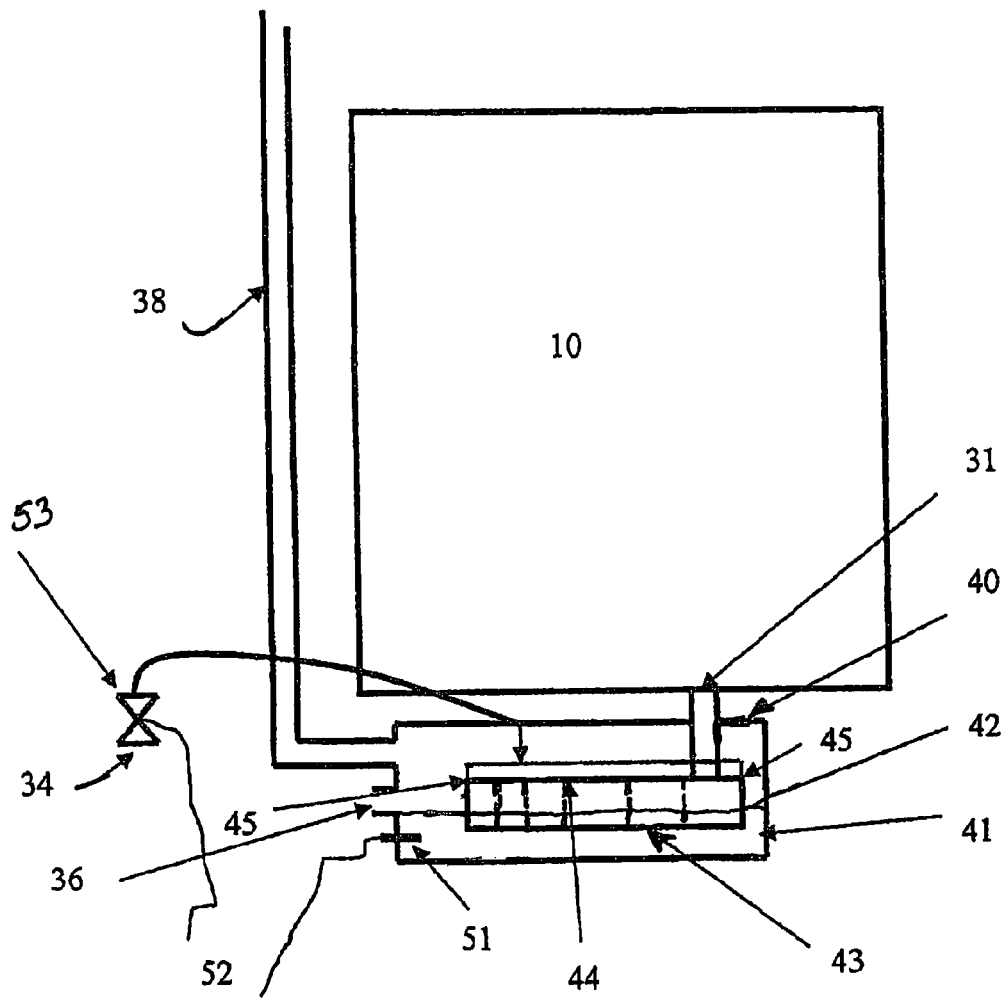
FIG. 1 a schematic view of a cooking apparatus according to the invention.

A cooking apparatus is illustrated in FIG. 1. For reasons of clarity, some components of this cooking apparatus have been left out, such as the individual parts of the housing, the apparatus control, or the heating elements. The apparatus is viewed from the side and reveals, in particular, a cooking chamber 10. Foods are prepared in the booking chamber 10 by heating, for example by baking, simmering, heating, and, in the process, are also exposed to, among other things, a certain amount of moisture.

A vapor outlet channel 31 leads downward from the cooking chamber 10. This vapor outlet channel carries the excess water vapor present in the cooking chamber 10, together with vapors that are created in the cooking chamber 10 due to treatment of the food, out from the cooking chamber 10. In the illustrated conception according to the invention, this vapor outlet channel 31, at the same time, also carries liquid, which may form there, away from the cooking chamber 10, such as fats or other liquids formed during the treatment of the food or the cooking product. Cleaning liquids that are used during cleaning before or after the cooking process in the cooking chamber 10 and, for instance, solid contamination residues that may have become detached from the cooking chamber 10 can also flow away through this vapor outlet channel.

The vapor outlet channel 31 leads into a vapor condensation device 40. This vapor condensation device 40 comprises, in particular, a bin-shaped container 41.

In the container 41 is a liquid bath 42, which has a surface or a liquid level.

A vapor guide element 43 is provided, which is viewed in FIG. 1 schematically from the side as a rectangle and which will be described in detail below.

The water vapor-containing vapors entering the container 41 through the vapor outlet channel 31 flow through this vapor guide element and are brought into contact in this vapor guide element 43 with the surface of the liquid bath 42. They condense on this surface.

The container 41 further has a cooking apparatus drain 36, the lower edge of which defines, at the same time, the height of the liquid level of the liquid bath 42 in the container 41. As a result, water condensing from the water vapor and fat and oil aerosols settling out cannot raise the liquid level of the liquid bath 42, because these additional liquid components flow immediately via the apparatus drain 36 into the building's sewer system (which is not illustrated).

In order to prevent gases from the building sewer system from being able to enter the container 41 and possibly the cooking chamber 10, it is possible to provide here a siphon 33, which, for reasons of clarity, is not illustrated here in detail and for which the liquid level of the liquid bath 42 serves as a water reservoir.

The air fractions of the vapors, freed of condensing water vapor as well as the fat and oil aerosols and other components, as well as other gases entering the container 41 from the cooking chamber 10 via the vapor outlet channel 31, can be discharged into the surroundings of the cooking apparatus via an exhaust air channel 38 out of the container 41. The air now does not have a particularly high fat and oil content, nor is it moist; therefore, it is more acceptable than conventional exhaust air in the surroundings of the cooking apparatus.

The temperature of the liquid bath 42 in the container 41 can be determined by means of a temperature sensor 51. According to FIG. 1, this temperature sensor 51 is connected to a control 52, which controls a valve 53, which regulates or controls the feed 34 of cool fresh water to the container 41 and hence also to the liquid bath 42.

On its top side, the vapor guide element 43 is formed by a platelike, essentially horizontal wall 44. Vertical, flat regions project from this horizontal wall 44 downwards to and just under the surface of the liquid bath 42. The cooling water feed 34 carries the cooling water to the wall 44 of the vapor guide element 43. In this case, in the illustrated embodiment, it is indicated that a raised edge 45 is provided above on the wall 44. This raised edge 45 surrounds a flat region in which the cooling water of the cooling water feed 34 is retained temporarily above at the wall 44 and thus ensures a cooling of this wall 44 and thereby, at the same time, of the entire vapor guide element 43, before this cooling water of the cooling water feed 34 then falls through an opening provided in the wall 44 into the interior of the vapor guide element 43 into the liquid bath 42.

In this case, this opening is preferably provided in the immediate vicinity of the vapor outlet channel 31, which leads here from the cooking chamber 10 also through the wall 44 into the interior of the vapor guide element 43 up to above the surface of the liquid bath 42.

The consequence of this is that the cooling water creates a flow within the vapor guide element 43 in at least the near-surface regions of the liquid bath 42, which leads to the movement of the fragments collecting and condensing on the surface of the liquid bath 42, together with the gaseous steams and vapors situated above it, through the vapor guide element 43.

Figure 2:
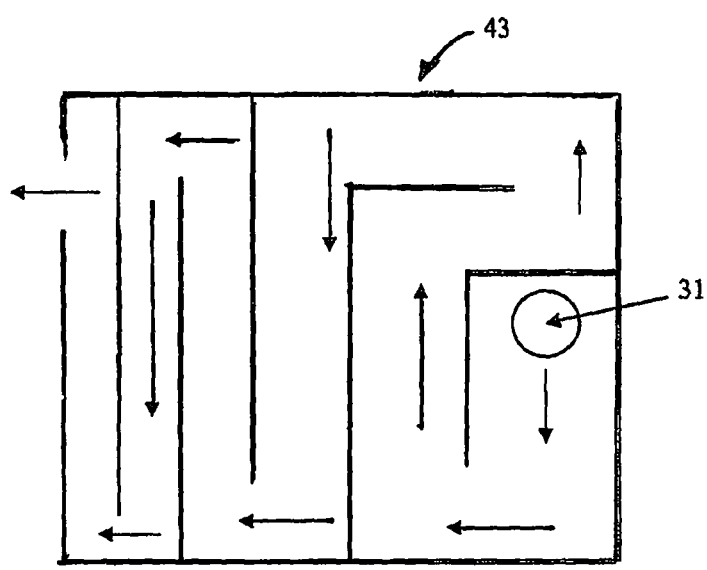
FIG. 2 a view of a key element, the vapor guide element, of the cooking apparatus of FIG. 1, viewed from below.

Indicated in FIG. 2, as already mentioned, is how a vapor guide element 43 might appear. The vapor guide element 43 is illustrated here from below, that is, as seen looking upwards from the liquid bath 42 through its surface. Seen here on the right is how vapors, water vapor, or other atmospheric gas enter from above out of the cooking chamber 10 through a vapor outlet channel 31 into the vapor guide element 43. To be considered here is that the liquid surface of the liquid bath 42 is situated in the plane of the sheet and the vapors thus do not pass through this surface.

Instead of this, they move on a meandering path, a channel whose lower boundary is formed by the surface of the liquid bath 42 and whose upper boundary forms a roughly plate-shaped construction as part of the vapor guide element 43. In between are vertical sheet metal plates, which, in the illustration in FIG. 2, are thus visible as lines and which form meandering channels.

In this case, it can be seen from FIG. 2 that the cross section of the single channel here becomes continuously smaller from right to left. This takes into account that, during their flow through the vapor guide element 43, the vapors deliver a part of their water vapor content through condensation to the liquid of the liquid bath 42 and thus the amount of flowing vapors also decreases.

Seen on the left is an outlet from the vapor guide element 43, which leads to an exhaust air channel 38.

The vertical sheet metal plates of the vapor guide element 43 project for a short distance through the surface of the liquid bath 42 into the liquid and thus prevent the flowing vapors from taking shortcuts through the water in the vapor guide element 43.

On the other hand, the vertical sheet metal plates of the vapor guide element 43 extend only a short way into the liquid of the liquid bath 42 so as to enable solids and small fragments to move freely beneath the vapor guide element 43 in the liquid bath 42 and thus reach the apparatus drain 36 without clogging the channel or channels in the vapor guide element 43.

In the illustration in FIG. 2, the arrows indicate the path of the vapors.

In the region of the outlet from the vapor guide element 43, the vertical sheet metal plate does not extend through the surface of the liquid bath 42, but rather, in this case, leaves a certain segment of the path unrestricted. This, too, is illustrated schematically in FIG. 2. This has the advantage that the oils and also solid particles present here on the surface of the liquid bath 42 can leave the vapor guide element 43 without any problem in order to be able to move further to the apparatus drain 36 on the side of the building.

LIST OF REFERENCE NUMBERS

10 Cooking chamber
31 Vapor outlet channel
33 Siphon
34 Cooling water feed
36 Apparatus drain
38 Exhaust air channel
40 Vapor condensation device
41 Container
42 Liquid bath
43 Vapor guide element
44 Wall
45 Raised edge
51 Temperature sensor
52 Control
53 Valve

What is claimed is:

1. In a cooking apparatus including a cooking chamber, a vapor outlet channel for vapors created in the cooking chamber, a vapor condensation device that brings the vapors into contact with cooling liquid, the vapor condensation device having a container in which a liquid bath is located, the vapor outlet channel carrying the vapors out of the cooking chamber into the container of the vapor condensation device, where the vapors are brought into contact with the liquid of the liquid bath and are thereby partially condensed, and a drain device, the improvement comprising the container of the vapor condensation device having a vapor guide element which guides the vapors through one or more open flow channels in the container, the vapor guide element being configured such that the upper surface of the liquid bath in the container is a lower wall of the one or more open flow channels along the entire flow length thereof and the vapor condensation device provides entirely above-liquid flow thereinto, therethrough and therefrom, the vapor guide element having a segment at its downstream outlet which does not extend through the surface of the liquid bath into the liquid but instead forms a passage above the upper surface of the liquid.

2. The cooking apparatus according to claim 1 wherein the vapor outlet channel is, at the same time, a drain for fluids from the cooking chamber and the container in the vapor condensation device is, at the same time, a collecting basin for the fluids flowing out of the cooking chamber and running into the fluid bath in the container.

3. The cooking apparatus according to claim 1 further including a siphon arranged upstream of the drain device in the container and wherein the liquid bath in the container constitutes, at the same time, a water reservoir in the siphon.

4. The cooking apparatus according to claim 3 wherein a temperature-controlled valve is provided, which, controlled by the temperature determined by means of a temperature sensor in the liquid bath, releases a cooling water feed.

5. The cooking apparatus according to claim 4 wherein the cooling water feed is delivered initially to a horizontal top wall of the vapor guide element, the horizontal wall having a raised edge therearound in order to form a water level on the vapor guide element such that the cooling water feed feeds the cooling water to the liquid bath adjacent to the vapor outlet channel.

6. The cooking apparatus according to claim 1 wherein the channel or channels is or are designed with a spiral shape within the vapor guide element.

7. The cooking apparatus according to claim 1 wherein the channel or channels is or are designed with a meandering shape within the vapor guide element.

8. The cooking apparatus according to claim 1 wherein further characterized in that the vapor guide element projects only slightly through the surface of liquid bath into the liquid bath.

9. The cooking apparatus according to claim 1 wherein the channels or channel formed by the vapor guide element decrease or decreases in cross-section continuously or discontinuously in the flow direction of the vapors.

\* \* \* \* \*